United States Patent [19]

Pacilio

[11] Patent Number: 4,690,043

[45] Date of Patent: Sep. 1, 1987

[54] PIZZA DOUGH SPREADING APPARATUS

[76] Inventor: Victor C. Pacilio, P.O. Box 10516, Phoenix, Ariz. 85064

[21] Appl. No.: 767,727

[22] Filed: Aug. 20, 1985

[51] Int. Cl.⁴ ............................................. A21C 11/00
[52] U.S. Cl. ..................................... 99/353; 99/450.1
[58] Field of Search ............ 99/352, 353, 450.1–450.5; 74/84 R; 425/429; 426/496, 512

[56] References Cited

U.S. PATENT DOCUMENTS 2,190,483  2/1940  Pacilio ................................... 99/352
3,390,645  7/1968  Pacilio ................................... 99/353

Primary Examiner—Timothy F. Simone
Attorney, Agent, or Firm—Nissle & Leeds

[57] ABSTRACT

Apparatus for centrifugally spreading a body of dough to form a generally circular soft pizza crust. The apparatus minimizes the likelihood that dough in the central portion of the crust will tear during centrifuging of the dough.

5 Claims, 7 Drawing Figures

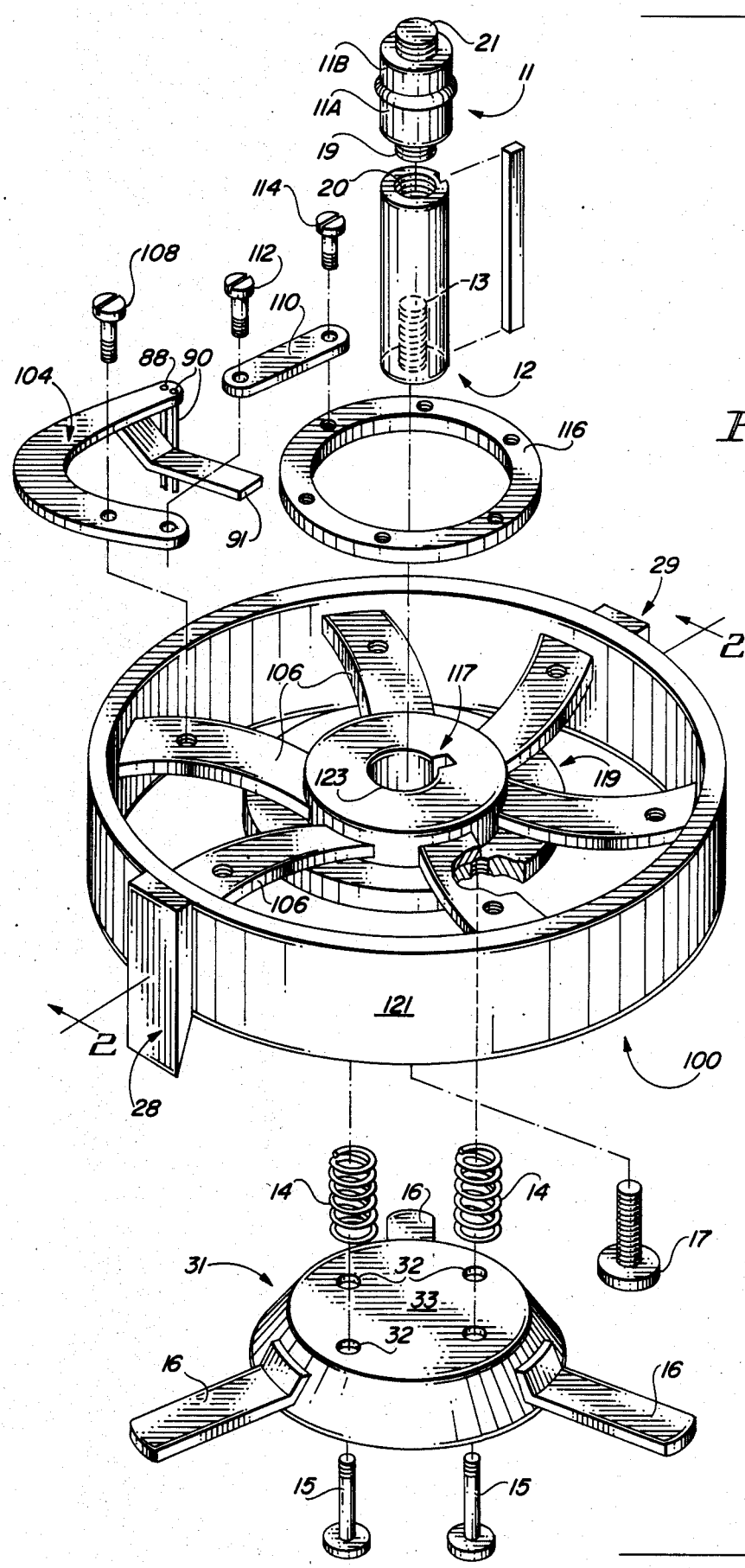

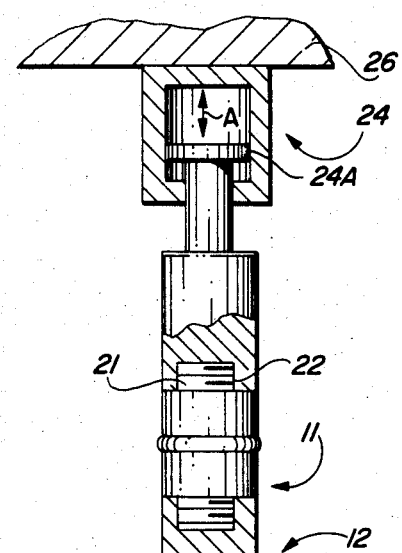
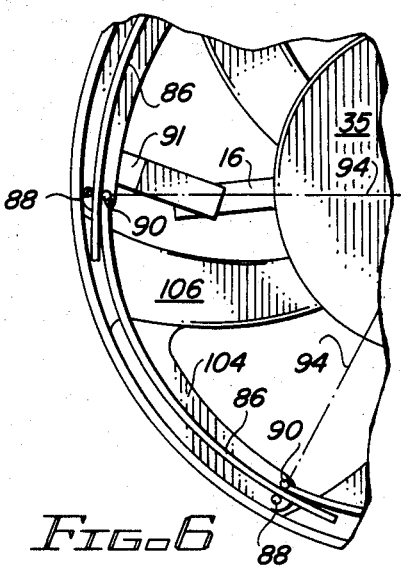
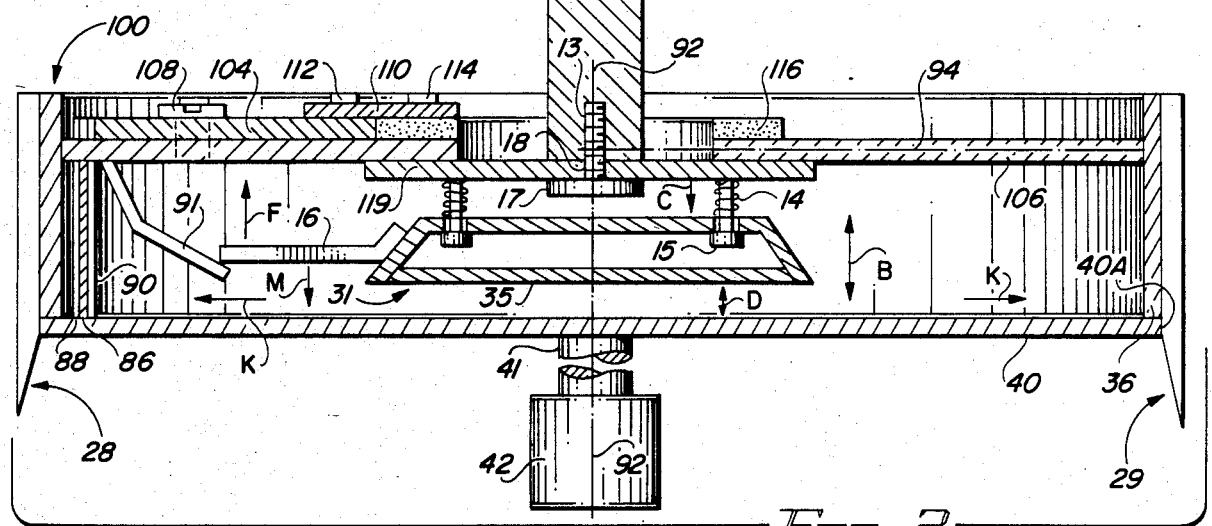
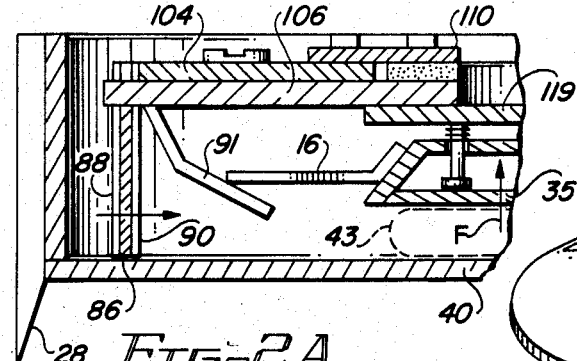
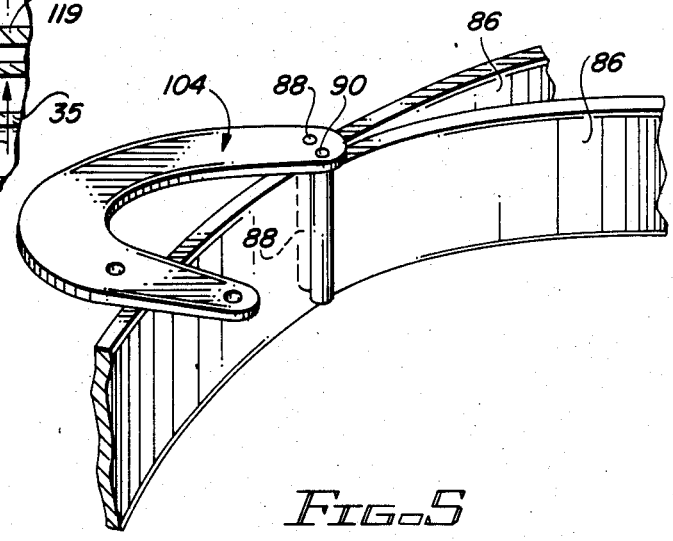

PIZZA DOUGH SPREADING APPARATUS

This invention relates to apparatus for producing pizza.

More particularly, this invention pertains to apparatus for producing a soft circular crust for a pizza by simultaneously compressing and applying centrifugal force to a body of pizza dough.

In a further respect, the invention pertains to apparatus of the type described for producing a soft dough crust for a pizza, the apparatus preventing dough at the center of the crust from tearing when centrifugal force is being applied to the dough.

Apparatus for automatically producing the circular dough crust for a pizza is well-known in the art. See for example, U.S. Pat. Nos. 3,390,645 and 2,190,483 to Pacilio. One disadvantage of such prior art apparatus is that it is unusually complicated and expensive to manufacture, particularly the gearing necessary to transmit motive power to the dough spreading components of the machine. Another disadvantage of such prior art machines is that the body of dough at the center of the crust tends to separate and tear when centrifugal force is applied to the dough.

The pizza dough spreading apparatus in U.S. Pat. No. 3,390,645 to Pacilio includes a truncated conically shaped central structure 125 having an annular lip 126 downwardly depending from circular sheet 128. Lip 126 downwardly bears against dough in the central area of the pizza crust to help prevent separation of the dough as the circular crust is formed by utilizing centrifugal force. However, the dough sometimes still tears along the narrow portion of the crust contacted by lip 126. In addition, as can be seen in FIG. 7 of U.S. Pat. No. 3,390,645, the body of dough initially placed in the pizza dough spreading apparatus extends upwardly past lip 126 and against panel 128. This means that the dough contacting panel 128 must travel downwardly and outwardly under lip 126 to expand when centrifugal force is applied to the dough. Member 125 and lip 126 therefore impede the outward distribution of dough and increase the likelihood that the dough will tear when it attempts to expand outwardly beneath lip 126 during centrifuging of the dough.

Accordingly, it would be highly desirable to provide an improved pizza dough spreading machine which was of simplified construction and operation and which reduced the likelihood that dough near the center of the crust would tear during centrifuging of the dough.

Therefore, it is an object of the invention to provide an improved pizza dough spreading machine which produces the circular crust for a pizza by simultaneously compressing and applying centrifugal force to a body of pizza dough.

Another object of the invention is to provide an improved pizza dough spreading machine which minimizes the likelihood that dough near the center of the crust will tear during centrifuging of the dough.

A further object of the instant invention is to provide improved pizza dough spreading apparatus of simplified construction and operation.

These and other, further and more specific objects and advantages of the invention will be apparent to those skilled in the art from the following detailed description thereof, taken in conjunction with the drawings, in which:

FIG. 1 is a perspective assembly view illustrating a pizza dough spreading mechanism constructed in accordance with the principles of the invention;

FIG. 2 is a section view of the pizza dough spreading mechanism of FIG. 1 taken along section line 2—2 thereof and further illustrating interior construction details thereof;

FIG. 2A is an enlarged view of a portion of the pizza dough spreading mechanism of FIG. 2;

FIG. 5 is an enlarged view of a portion of the pizza dough spreading apparatus of FIG. 4; and, FIG. 6 is a partial bottom view of the pizza dough spreading mechanism of FIG. 1.

Briefly, in accordance with my invention, I provide improved apparatus for spreading a body of dough to form a generally circular soft pizza crust. The apparatus includes a surface for receiving and supporting a body of dough; means for rotatably driving the support surface to centrifugally spread the body of dough; dough retaining means for controlling the spreading of the body of dough; at least one planar surface fixed to be lowered toward the support surface to engage a central portion of the body of dough against further displacement by centrifugal forces; and, means for raising the planar surface to a first position above the support surface when the body of dough is initially placed on the support surface, and, for continuously gradually lowering the planar surface from its first position toward a second position adjacent the support surface during spreading of the dough. The dough retaining means includes a plurality of guides and a plurality of flexible strips, each having one end affixed to one of said guides and extending to be slidably received in an adjacent guide to define a variable diameter peripheral annular rim.

Figure 3:
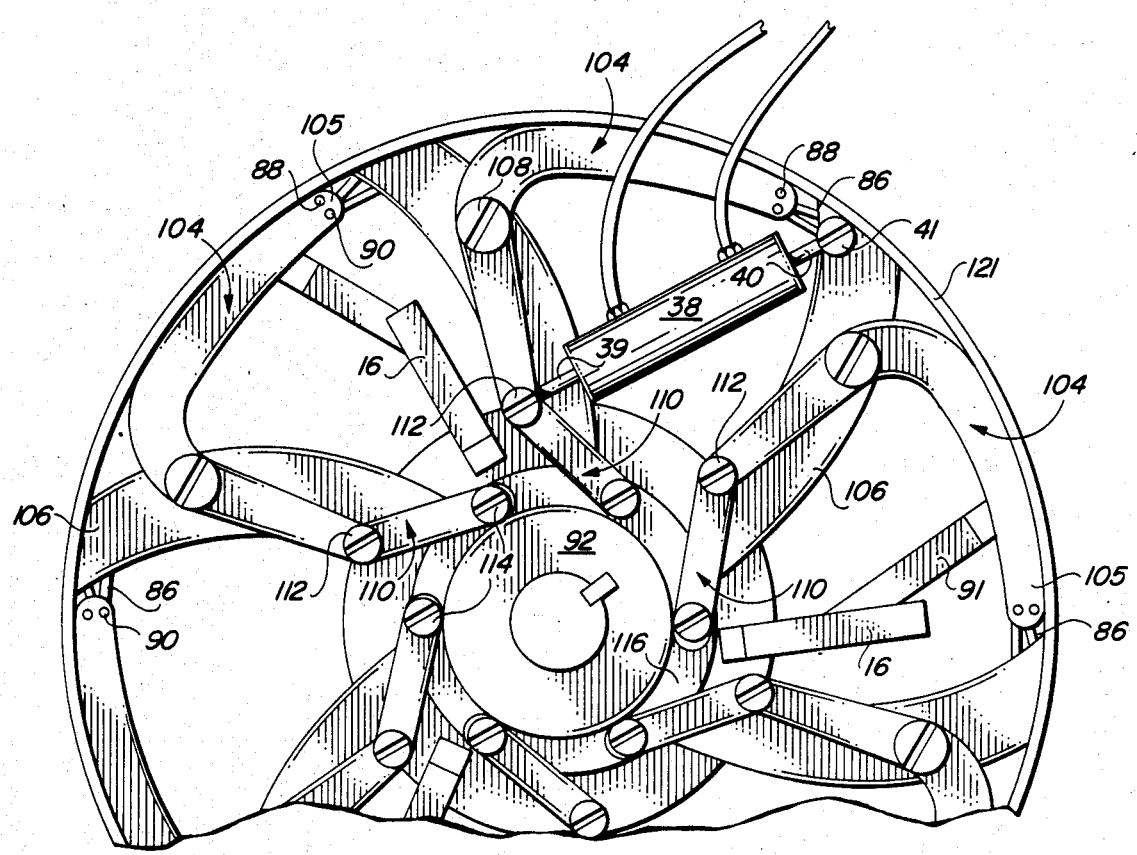
FIG. 3 is a top view further illustrating the pizza dough spreading mechanism of FIG. 1.
Figure 4:
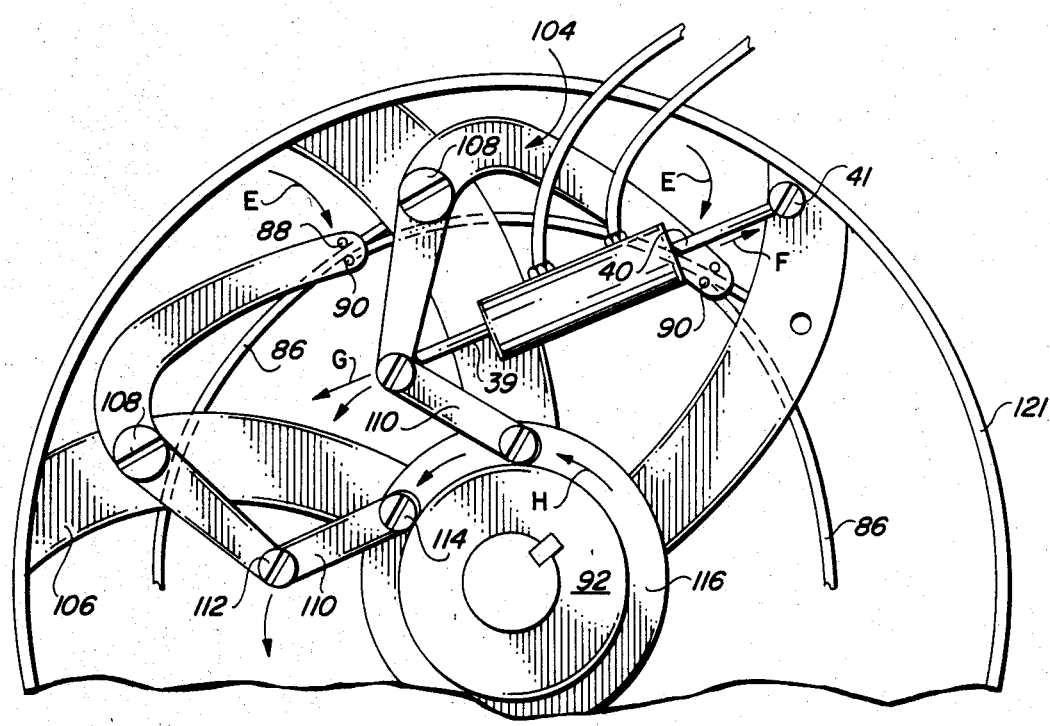
FIG. 4 is a top view of the pizza dough spreading mechanism of FIG. 3 illustrating the mode of operation thereof.

Turning now to the drawings, which depict the presently preferred embodiments of the invention for the purpose of illustrating the practice thereof and not by way of limitation of the scope of the invention, and in which like reference characters represent corresponding elements throughout the several views, FIGS. 1-6 illustrate the pizza dough spreading mechanism of the invention, including strips 86 of flexible sheet metal. One end of each of the strips 86 is rigidly affixed to a pin 88 which is spaced apart from a pin 90 to provide a slot therebetween that receives the free end of a strip 86. Pins 88 and 90 are movably mounted for various radial displacements from a center 92 so that the length of the radial line 94 (FIG. 6) may vary. Therefore, when pins 88 and 90 are placed in close proximity to center 92 as shown in FIG. 4, i.e., when lines 94 are short, the developed circle defined by strip 86 is small. However, as pins 88 and 90 move away from center 92, each overlapped strip 86 withdraws from its associated slot between a pin pair 88, 90 to define an expanded circular or ring configuration. In this manner, the pizza dough is initially confined within a relatively small ring (FIG. 4) and thereafter, simultaneously with the spreading of the dough, the ring is controlled by a pneumatic unit which permits ends 88 and 90 to withdraw away from center 92 to the fully expanded position shown in FIGS. 2 and 3.

The motion for driving pins 88 and 90 inwardly or outwardly in relation to center structure 92 is accomplished by a rotary arrangement of spaced apart levers as shown in FIGS. 3, 4 and 6. Specifically, FIGS. 3 and 4 are top plan views of the dough-containing structure while FIG. 6 is a bottom plan view of the structure. The unitary frame 100 of the structure is substantially a rigid wheel-like member upon which the various moving parts are carried. Extending upwardly from the bottom of member 100 are spaced-apart pairs of pins 88 and 90 (FIG. 6) defining a slot therebetween which receives the free end of a stip 86. As indicated, the fixed end of each of the strips 86 is attached to one of pins 90.

Pin pairs 88, 90 are each carried on one of interconnected arcuate arms 104 (FIGS. 1, 3 and 4) pivotally affixed to spokes 106 of frame 100 by threadably engaged studs 108. The pivotal displacement of arms 104 about studs 108 positions pins 88 and 90 at various radial distances from the center of the frame 100. This displacement is accomplished through a group of straight links 110 connected by studs 112 to the internal ends of each of the arms 100 to provide a pivotal coupling. The other end (internal) of link 110 is pivotally connected to a stud 114 in an annular hub 116 which is rotatably mounted on upstanding cylindrical panel-shaped neck 117 of frame 100. Neck 117 upwardly depends from cylindrical panel 119.

As hub 116 revolves relative to the frame 100, links 110 pivotally swing arms 104 about studs 108, radially moving the free ends of these arms 104 which carry pins 88 and 90. In this manner, pins 88 and 90 are positioned at various radial displacements to position strips 86 to define a ring of varying diameter.

The inner ends of spokes 106 are affixed to neck 117 and panel 119, while the outer ends of the spokes are affixed to circular rim 121 of frame 100. Aperture 123 formed through neck 117 receives the lower end of number 12 having internally threaded aperture 13 formed therein. Aperture 13 receives externally threaded screw 17 extending through aperture 18 in panel 119 (FIG. 2). Externally threaded nipple 19 of swivel joint 11 turns into internally aperture 20 formed in member 12. The lower half 11A of joint 11 rotates with respect to upper half 11B. Threaded nipple 21 of joint 11 is received by internally threaded aperture 22 formed in the pneumatic cylinder unit 24 fixedly secured to support surface 26. Air is directed into unit 24 to vertically displace piston 24A in the directions of arrows A to raise and lower frame 100 and members 11 and 12 securing frame 100 to unit 24. Guides 28, 29 are secured to rim 121 of frame 100. Truncated, conically shaped member 31 is movably secured to panel 119 by screws 115 passing through apertures 32 formed in upper panel 33 of member 31. Apertures 32 permit member 31 to vertically slide along the necks of screws 15 in the directions indicated by arrows B in FIG. 2. Springs 14 circumscribe the portions of the necks of screws 15 intermediate panels 33 and 119, and continually exert a downward force against panel 33 in the direction of arrow C. Member 31 includes circular planar bottom surface 35. Generally horizontally disposed arms 16 extend outwardly from member 31 and engage fingers 91 attached to and extending inwardly from the distal tips 105 of certain ones of arcuate arms 104. In FIG. 2, the distal tips 105 of arms 104 are positioned at their outermost position of travel against rim 121, i.e., in the position in which strips 86 form the circular perimeter having the greatest diameter, and lower surface 35 of member 31 is positioned at its closest distance D to lower lip 36 of rim 121. When arcuate arms 104 pivot about studs 108 such that distal tips 105 and pin pairs 88, 90 attached thereto move inwardly in the direction of arrows E in FIG. 4, each finger 91 slides under and upwardly displaces its associated arm 16 in the direction of arrow F, raising member 31 and surface 35 upwardly away from the lower edge 36 of rim 121.

Arcuate arms 104 are pivoted about studs 108 by pneumatic cylinder unit 38 having arms 39 and 40 pivotally attached to studs 112 and 41. In FIG. 3 arm 40 of pneumatic unit 38 is fully retracted and distal ends 105 of arcuate arms 104 are in their fully extended position adjacent rim 121. In FIG. 4, compressed air has been directed into unit 38 to extend arm 40 in the direction of arrow F and displace screw 112 attached to the outer end of rod 39 in the direction of arrow G. When screw 112 attached to the outer end of rod 39 is displaced in the direction of arrow G, it causes link 110 to rotate hub 116 in the direction of arrows H and distal end 105 of arcuate arm 104 secured to bolt 112 to move inwardly in the direction of arrow E. When hub 116 rotates in the direction of arrows H it causes each arcuate arm 104 to pivot about its associated screw 108 such that its distal end 105 travels inwardly in the direction of arrow E. Distal end 105 of each arcuate arm 104 includes a pin pair 88, 90.

In the operation of the dough-spreading apparatus of the invention, a body of dough 43 is placed on the central portion of panel 40 and pneumatic cylinder 24 is actuated to lower frame 100 until the lower edge 36 of rim 121 contacts panel 40. When edge 36 contacts panel 40, pneumatic cylinder 38 is activated to cause distal ends 105 of arms 104 to move from their fully extended position of FIG. 3 inwardly in the direction of arrows E (FIG. 4), to cause strips 86 to form a smaller circular perimeter around dough body 43, and, to cause fingers 91 to move inwardly toward center 92 and upwardly displace arms 16 and lower surface 35 of member 31. Motor 42 is activated to cause panel member 40 to rotate at a relatively high rpm. When panel member 40 rotates, frame 100, member 12, and lower half 11A of swivel member 11 also rotate. Upper portion 11B and pneumatic cylinder 24 do not rotate when panel member 40 and frame 100 rotate. When member 40 and frame 100 rotate, the centrifugal forces K generated cause the body of dough 43 to expand outwardly and flatten. The centrifugal forces K also cause distal ends 105 of arm 104 to expand outwardly toward rim 121 in a direction of travel opposite that indicated by arrows E in FIG. 4. A minimal amount of resistance is maintained in cylinder 38 such that retraction of arm 40 into unit 38 during rotation of panel 40 and frame 100 slows but does not prevent the rotation of arms 104 about studs 108 and the outward movement of distal ends 105 toward rim 121. The resistance offered by unit 38 to the outward expansion of distal ends 105 can be varied as desired. For instance, sometimes it is preferable to initially allow distal ends 105 to expand outwardly fairly rapidly, and to reduce the rate of outward expansion of distal ends 105 and strips 86 as ends 105 approach rim 121. The speed of expansion of distal ends 105 can be controlled in this fashion by controlling the rate at which arm 40 retracts into unit 38 or by controlling the rpm's of member 40.

During rotation of panel 40, dough body 43 on panel 40 is subjected to centrifugal forces K which spread the dough generally uniformly over panel 40 into a circular crust configuration. In this regard, as the body of dough 43 expands and the distal ends 105 of arms 104 outwardly expand, arm 91 also expands outwardly, permitting arms 16 and lower surface 35 to be downwardly displaced toward panel 40. Springs 14 outwardly expand and force surface 35 downwardly against dough body 43 when fingers 91 move outwardly from center 92 and permit arms 16 to move downwardly toward panel 40 in the direction of arrow M. As indicated, in FIG. 2 arrows D represent the minimum distance between surface 35 and panel member 40 when frame 100 is lowered onto panel member 40 and lower edge 36 of rim 121 contacts member 40. Distance D is equivalent to the desired thickness of the soft pizza crust produced from dough body 43 by the apparatus of FIGS. 1 to 6. Accordingly, after pneumatic-cylinder 24 is activated to drop frame 100 onto panel 40 and panel 40 is rotated, surface 35 continues to press downwardly against dough body 43 as the dough expands into a soft circular blank or crust. The continual pressure of lower surface 35 against the central portion of the soft dough 43 helps prevent tearing of the central portion of the dough during centrifuging of the dough to form a soft circular crust.

FIG. 2A further illustrates the cam action between each finger 91 - arm 16 pair which raise and lower member 31 and surface 35 during utilization of the pizza dough spreading apparatus illustrated in the drawings. Member 31 is lowered as strips 86 move to define an expanding circular perimeter and is raised when strips 86 are contracted in the manner shown in FIG. 4. This movement is accomplished by continuously contacting surfaces on each finger 91 - arm 16 cam pair. The contacting surfaces of each cam pair 91, 16 cooperate to raise member 31 during inward movement of distal ends 105 and to continuously lower member 31 during the outward movement of distal ends 105 to a position adjacent rim 121.

When pneumatic cylinder 24 is activated to lower frame 100 into panel 40, guides 28, 29 center the frame 100 on panel 40 and insure that lower lip 36 of rim 121 is positioned on top of panel 40 adjacent circular peripheral edge 40A of panel 40.

After a body of dough 43 is placed on panel 40 and cylinder 24 is activated to lower frame 100 onto circular panel member 40, member 40 is rapidly rotated for a selected length of time to centrifugally cause distal ends 105 of arms 104 to expand outwardly to a position adjacent rim 121 and to cause the dough body 43 to expand into a circular crust having a generally uniform thickness D and having a generally circular outer peripheral edge abutting metal strips 86. The rotation of member 40 is discontinued after said selected length of time and pneumatic cylinder 40 is activated to raise frame 100 upwardly away from panel 40 and from the soft circular dough crust on panel 40. The circular dough crust can be removed from panel 40 or can, while remaining on panel 40, be garnished, baked, etc.

Having described my invention in such terms as to enable those skilled in the art to understand and practice it, and having identified the presently preferred embodiments thereof, I claim:

1. Apparatus for spreading a body of dough to form a generally circular soft pizza crust, comprising
   (a) a support surface for receiving a body of dough;
   (b) dough retaining means for controlling the centrifugal spreading of said body of dough on said support surface, including
      (i) a frame member contacting said tray and circumscribing said body of dough,
      (ii) a support structure centered in and connected to said frame member,
      (iii) a plurality of arm-linkage means connected to said support structure and extending outwardly from said support structure toward said frame, each of said arm-linkage means having an outer end adjustable inwardly toward and outwardly away from said support structure,
      (iv) a plurality of guides, each attached to said outer end of one of said arm-linkage means,
      (v) a plurality of flexible strips, each having one end affixed to one of said guides and extending to be slidably received in an another of said guides to define a variable diameter peripheral annular rim around said body of dough, said diameter of said peripheral annular rim being varied by adjusting said arm-linkage means and guides attached thereto inwardly and outwardly from said support structure,
      (vi) a generally continuous circular flat planar surface attached to said support structure above said support surface and
         terminating at a peripheral edge, and
         continuously contacting a central portion of said body of dough during centrifugal spreading said dough, said central portion of dough contacted by said flat planar surface, said peripheral edge of said planar surface circumscribing said central portion of said body of dough,
      (vii) means for urging
         said flat planar surface into continuous contact with said central portion of said body of dough, and
         said flat planar surface toward said support surface and away from said support structure during the centrifugal spreading of the body of dough; and
   (c) motive power means for rotating said support surface to centrifugally spread said body of dough, said rotation of said support surface causing said dough retaining means to simultaneously rotate with said support surface.

2. The apparatus of claim 1 wherein said urging means includes spring means for forcing said flat planar surface away from said support structure toward said support surface.

3. The apparatus of claim 2 wherein said spring means is interposed between said flat planar surface and said support structure.

4. The apparatus of claim 3 including
   (a) a panel member connected to and spaced away from said flat planar surface;
   (b) a plurality of apertures formed through said panel member; and,
   (c) a plurality of pins attached to said support structure and each slidably extending downwardly through one of said apertures in said panel member such that said panel member slides
      (i) upwardly over said pins when said ends of said arm-linkage means move inwardly, and
      (ii) downwardly over said pins when said ends of said arm-linkage means move outwardly.

5. The apparatus of claim 4 including cam means to operatively associate and synchronize the movement of said arm-linkage means and said urging means, said cam means including (a) a plurality of spaced apart arms connected to and extending outwardly from said support surface, each of said arms having a distal end spaced away from said support surface, and (b) a plurality of fingers each attached to one of said arm-linkage means and extending inwardly toward said support structure and having a sloped surface continuously contacting said distal end of one of said arms, said fingers simultaneously moving inwardly and outwardly from said support structure with said support structure with said ends of said arm-linkage means and causing said distal ends of said arms and said support surface to slide (i) upwardly along said sloped surface to raise said flat planar surface upwardly away from said support surface when said distal ends of said arm-linkage means move inwardly toward said support structure, and (ii) downwardly along said sloped surface to permit said flat planar surface to be downwardly urged toward said support surface by said urging means when said distal ends of said arm-linkage means move outwardly away from said support structure.

* * * * *